…

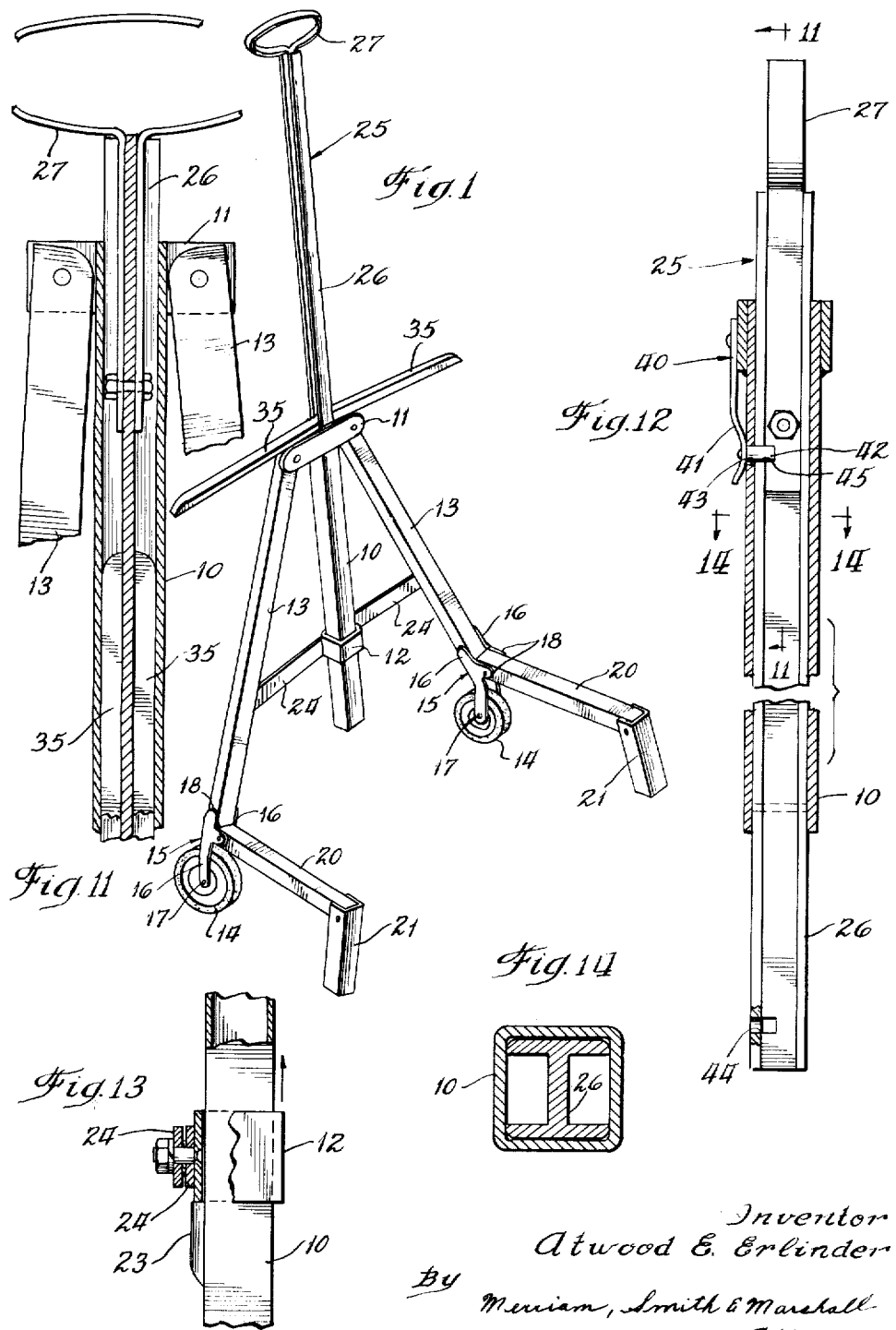

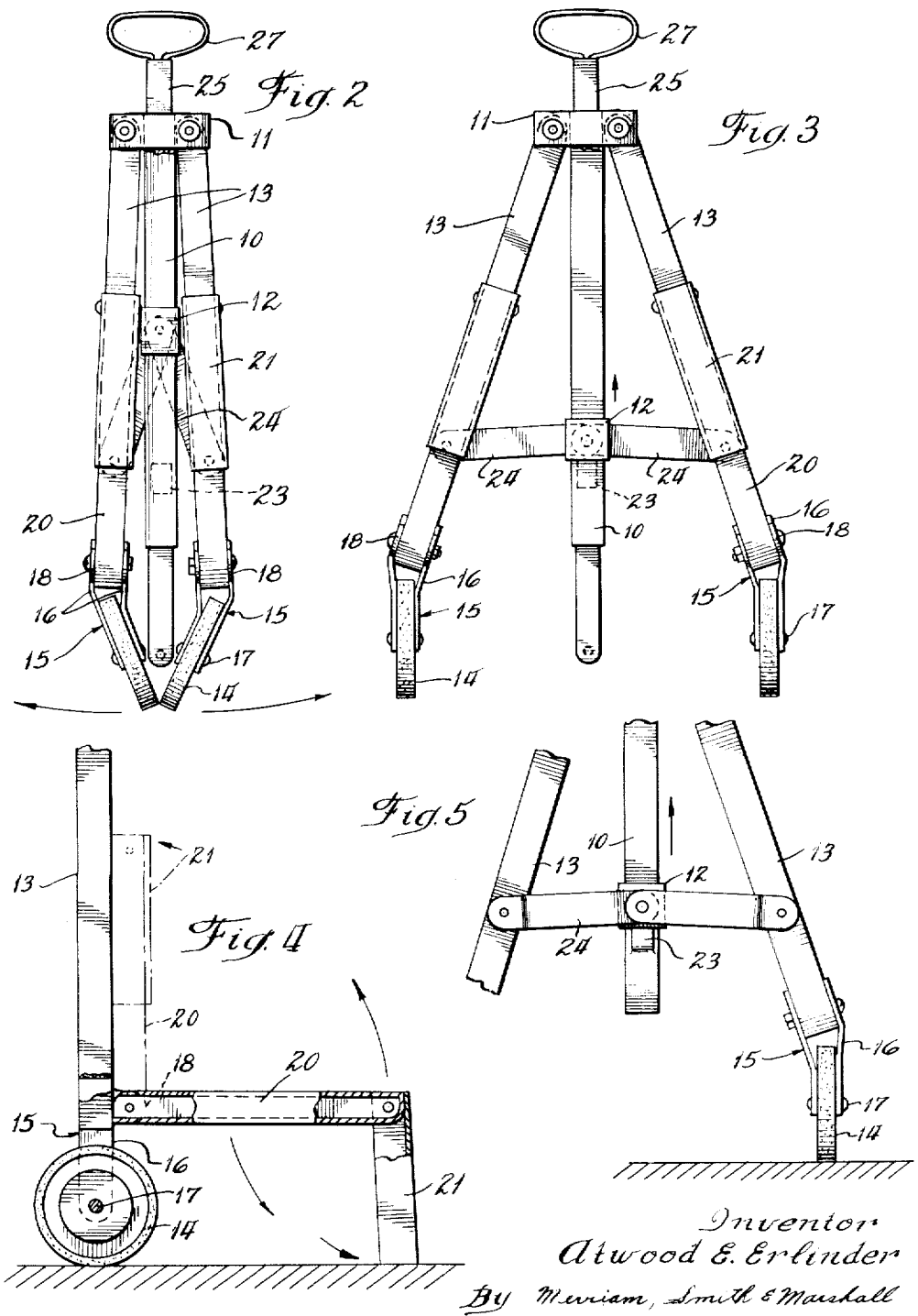

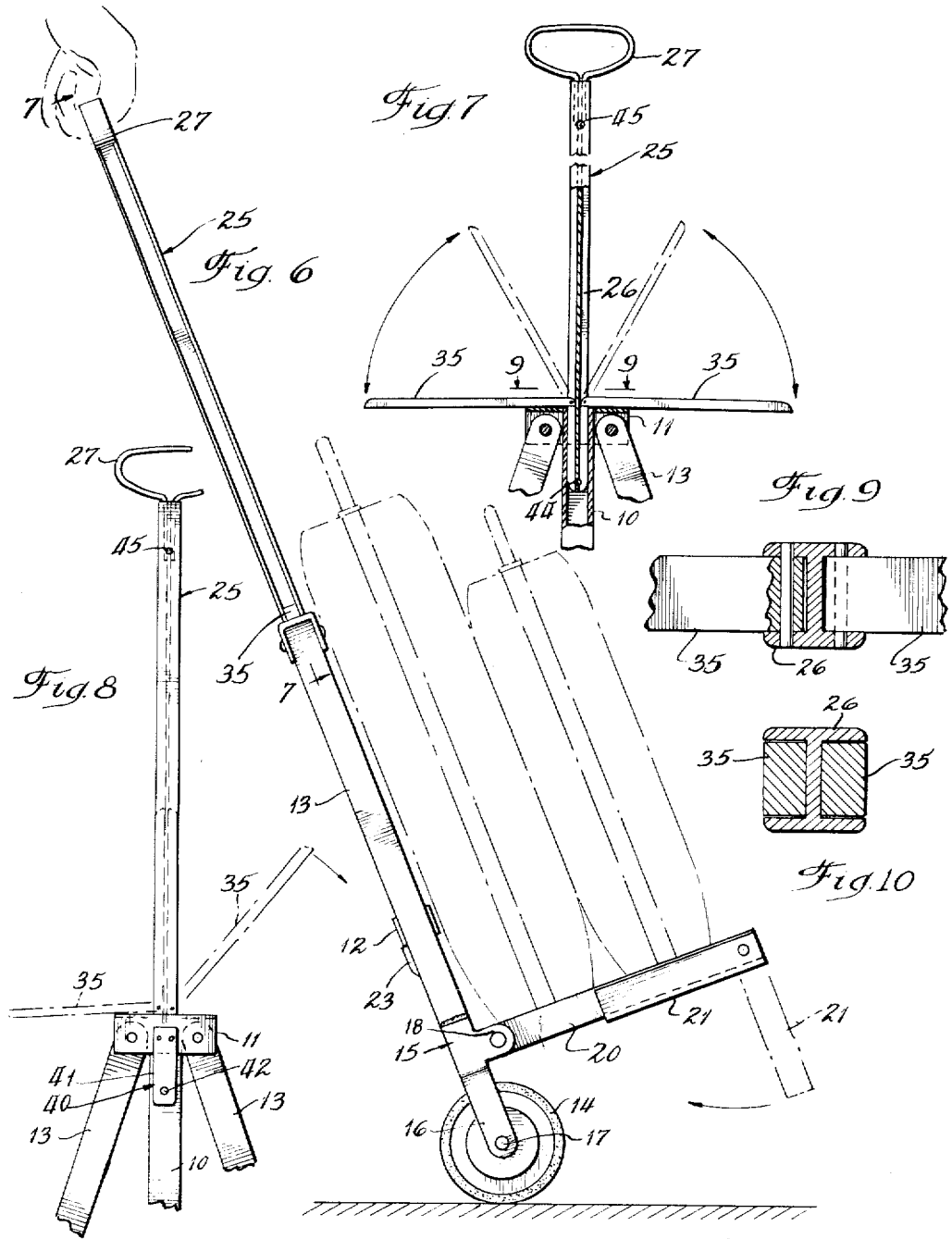

United States Patent Office 3,197,226
Patented July 27, 1965

3,197,226
FOLDING LUGGAGE CARRIER
Atwood E. Erlinder, 9118 S. Loomis, Chicago, Ill.
Filed Dec. 17, 1963, Ser. No. 331,142
9 Claims. (Cl. 280—36)

This invention relates to a wheeled hand truck. It more particularly relates to a foldable hand cart especially adaptable as a luggage carrier.

Modern transportation facilities, such as train and airplane terminals, are provided with baggage handling equipment that is primarily designed for travelers who are checking their luggage through from the ticket or reservation desk in the terminal to be thereafter claimed at a baggage reclaiming facility located at the terminal in the place to which the traveler has been transported. Baggage handling problems, however, still exist for the person who desires to keep his hand luggage in his personal possession throughout the course of his trip. Airplanes and railroads provide and permit such so-called "carry-on" services. Similar baggage handling problems also arise in transporting luggage from automobile transportation by which the traveler has arrived at the terminal to the ticket or reservation counter at which point the luggage can be checked in for through handling.

While porter service is sometimes available in train and airplane terminals to provide assistance for the handling of luggage from the automobile transportation to the point of check-in, or to the point of boarding the train or plane, assistance is generally not available when the traveler arrives at his destinatioin terminal upon the completion of the train or plane trip. Pedestrian travel over the extended areas covered by airports and railroad stations to the exits provide an enervating experience for the traveler who must carry his own luggage to the terminal exit for transfer to automobile transportation or the like.

According to this invention, there is provided a lightweight foldable hand cart, strong enough to carry readily the conventional amount of luggage which a person can conveniently retain in his possession throughout his trip, but which is foldable into a compact structure which can be stored with the luggage with a minimum of storage space requirement.

Referring to the drawings:

FIGURE 1 is an isometric view of the hand cart of this inveniton, with the various elements unfolded into a service position;

FIGURE 2 is a view of the hand cart of this invention with the retractable wheel assembly folded into a carrying position;

FIGURE 3 illustrates the hand cart with the retractable wheel assembly unfolded into operating position;

FIGURE 4 is a fragmentary side view showing the retractable support bar and the pivotable leg attached thereto;

FIGURE 5 is a fragmentary view of the retractable wheel assembly illustrating the direction of movement of the slidable bracket and leg linkage assembly;

FIGURE 6 is a side view of the illustrative embodiment of this invention illustrating the manner in which luggage is transported on the hand cart;

FIGURE 7 is a fragmentary view through line 7—7 of FIGURE 6 of an auxiliary support system which is employed to provide stability to the load while it is being transported on the carrier;

FIGURE 8 is another fragmentary view of the auxiliary bar system;

FIGURE 9 is a cross-sectional view through line 9—9 of FIGURE 7, showing the manner in which the auxiliary support bars are pivotally attached to the retractable handle;

FIGURE 10 is a cross-sectional view of the retractable handle with the auxiliary support bars moved into a folded position, illustrating the manner in which the support bars next within the channels provided in the retractable handle;

FIGURE 11 is an enlarged, fragmentary view of the rod-like standard showing the manner in which the handle is telescoped within the hollow interior thereof;

FIGURE 12 is a side view of the handle system, illustrating the lock means employed to lock the handle in either a retracted or extended position;

FIGURE 13 is a fragmentary view showing in partial cross-section the stop means employed for positioning the slidable bracket on the rod-like standard; and, FIGURE 14 is a cross-sectional view through line 14—14 of FIGURE 12, illustrating the manner in which the retractable handle telescopes within the hollow interior of the rod-like standard.

In the drawings, there is shown an illustrative embodiment of the foldable hand cart of this invention. From these drawings it is seen that the hand cart comprises a tubular, rod-like standard 10, a fixed bracket assembly 11 secured to one end of the standard 10, and a slidable bracket 12 slidably mounted on the standard 10. The retractable wheel assembly comprises a pair of leg elements 13, each of which elements are pivotally attached at one end to the fixed bracket 11 on opposite sides thereof. The bracket design and means of pivotal attachment are correlated to permit the leg elements 13, upon folding, to lay close to the standard 10. The other end of each of the leg elements 13 is provided with a wheel 14, which rolls in engagement with the road surface upon which the hand cart is to be pulled. The wheels 14 are journaled in a fork 15 consisting of a pair of depending arms 16 which are secured to the other end of the leg elements 15. Axles 17, upon which the wheels rotate, are mounted on the fork 15. The fork is obliquely mounted on the leg elements 13 at an angle such that they will be perpendicular to the standard 10 when the leg elements 13 are unfolded into operating position. Lugs 18, between which are pivotally mounted load support bars 20, are also attached to fork 15. The free ends of the load support bars 20 have pivotally attached thereto legs 21 which, when unfolded, permit the hand cart of this invention to rest in an upright position. It will be noted that the load support bars 20 are attached to the lugs 18 such that the support bars 20 can be folded against the leg elements 13. Furthermore, the legs 21 have a channel-shaped cross-section which permits the load support bars 20 to nest within the channel structure of the support legs 21, thereby further reducing the profile dimensions of the cart.

Interconnected between sliding bracket 12 and the leg elements 13 are links 24, which hold the leg elements in the unfolded position when the sliding bracket 12 is moved into position against the stop means 23 provided adjacent the end of standard 10. When the slidable bracket 12 is brought into abutment against stop means 23, the link elements 24 are positioned normal to the rod-like standard 10. The link elements 24 are attached to the leg elements 13 such that the plane of the wheels 14 is parallel to the longitudinal axis of the rod-like standard 10 when the retractable wheel assembly is unfolded.

A retractable handle assembly 25 is provided by employing a hollow, tubular member for the rod-like standard 10. Preferably, the retractable handle assembly 25 has an H-shaped structure 26, with the H-shaped structure having a configuration which permits it to be inserted snugly within the tubular member and oriented therein so that the plane of the web of the handle is parallel to the plane of the wheels when the foldable cart is unfolded into the use position, thereby providing opposed channels which respectively face outwardly toward the sides of the cart. In these channels is suitable attached handle 27 and auxiliary support members 35. The auxiliary support members 35 are pivotally attached at one end within the channels formed in the retractable handle structure, the width of the auxiliary support members 35 being such as to permit the support members 35 to nest within the channels. The retractable handle assembly 25 is held in the retracted or extended position by lock assembly 40, consisting of a leaf spring 41 having a detent pin 42 attached to the free end thereof. The detent pin 42 passes through a hole traversing one of the sidewalls of the tubular rod-like standard 10. There is also provided adjacent the opposed ends of retractable handle assembly 25 detent holes 44 and 45. When the handle assembly 25 is retracted, as is shown in FIGURE 12, it is depressed within the tubular standard 10 until detent hole 45 registers with hole 43 provided in the sidewall of tubular standard 10, thereby permitting pin 42 to pass through both holes and lock the retractable handle in position. In the extended position, the handle assembly 25 is withdrawn from the tubular standard 10 until detent hole 44 is brought into registry with hole 43, thereby permitting pin 42 to enter hole 44 and lock the handle assembly 25 in the extended position.

In operation, the luggage carrier of this invention, when not being used as a luggage carrier, is normally carried or stored in the condition shown in FIGURE 1, with the leg elements 13 folded against the standard 10 and with the handle assembly 25 retracted within the tubular standard 10 and locked in place. The load support bars 20 are folded against the leg elements 13, with the legs 21 in turn folded against the support bars 20, which nest within the channel configuration of the legs 21. In order to use the luggage carrier, it is only necessary to move the sliding bracket 12 downwardly into position against stop means 25, which moving action is transferred through linkage elements 24 to force the folding leg elements 13 into operating condition. Thereafter, the handle assembly 25 is unlocked and pulled from its retracted position into the extended position, and locked in place by engaging the detent pin 42 of lock 40 with the detent hole 44 located on the sliding handle assembly 25. The load support bars 20 are folded down in order to provide a platform upon which luggage can be placed as shown in FIGURE 6. In order to provide further stability to the luggage load which is being carried, the support members 35 can be unfolded from their nested position within the opposed channels formed in the shank 26 of the handle assembly. The luggage which is positioned on the support platform adjacent the standard 10 can then rest upon support members 35, as shown in FIGURE 6, thereby minimizing any tipping of the luggage from the support platform.

In the event that one wishes to stop during the course of transporting the luggage on the carrier and bring the luggage carrier to rest in an erect position unsupported, it is only necessary to unfold the legs 21, which frictionally engage the support bars 20 and which are of a length sufficient to permit the platform to stand in a position substantially parallel with the floor. Thus, if the luggage carrier is brought to rest on a level surface, the carrier will be made self-supporting by unfolding the legs 21 to the position as shown in FIGURES 1 and 4. After the carrier has been used to transport the luggage to the desired location, the luggage is unloaded and the reverse operation of that described above is employed to fold the carrier back into the condition shown in FIGURE 1, to enable the carrier to be placed in a convenient storage space which may be on an overhead luggage rack, such as is employed on railroad coaches, or in an underseat space provided by airlines for carry-on type of luggage.

The dimensions of the various elements and materials of construction should be selected to provide a compact, lightweight package that can be easily carried and readily stored. For example, the illustrative embodiment folds into a package 22" long and 6" wide, weighing 4 lbs. Accordingly, in fabricating and assembling the luggage carrier of this invention, conventional lightweight materials of construction should be utilized. It is preferred, in manufacturing the carrier of this invention that, in order to provide maximum strength with minimum weight, tubing having a square cross-sectional configuration be employed, thus facilitating the assembly of the retractable handle mechanism as well as the other elements of the carrier. In the illustrative embodiment of this invention which has been fabricated, 1" square aluminum tubing having a .050" wall thickness has been used. If desired, however, round tubing can also be utilized. The angle to which the leg elements 13 are unfolded must be sufficient to provide a stable hand cart and minimize any tipping which might occur if the legs are placed too close to the upright rod-like standard 10. The leg elements 13, however, should not be spread too far apart in order to avoid interferences with walls and doorframes encountered during the use of the carrier. Accordingly, an angular displacement of about 20°–30° for the leg elements is preferred. However, angles greater or less than this can be employed if desired. The selection of the wheel size is again one of preference; however, the size of the wheel should be such that the cart can be pulled over obstructions on the surface over which it is being rolled without too much jostling. On the other hand, too large a wheel size is undesirable from the standpoint of storage requirements and the desired collapsed size of the carrier. Accordingly, a wheel size of about 3"–6" in diameter is preferred, although larger or smaller wheels can be employed depending upon the service in which the carrier is to be used.

A variety of bracket arrangements can be utilized as alternatives for the fork 15 arrangement illustrated for mounting the wheels on the leg elements. It is preferred, however, that a bracket be employed so as to permit the wheels to be in vertical alignment with the rolling surface when the luggage carrier is unfolded for use. To minimize friction, ball bearing wheels are preferred; however, bushing type casters can also be utilized for mounting the wheels on the leg elements.

Although the luggage carrier of this invention has been hereinbefore described with reference to an illustrative specific embodiment, it is evident that variations and modifications of the illustrative design can be made without departing from the scope of the invention. Accordingly, it is intended that the invention be limited only in the manner set forth in the appended claims.

What is claimed is:

1. A collapsible, wheeled truck which comprises a rod-like tubular standard having a square cross-section, an H-shaped handle means slidably mounted within said standard, to permit said handle means to be withdrawn from said standard to an extended position, said handle means having a hand grip attached to one end, a handle lock means comprising a detent pin traversing an opening provided in said standard and biased into a normally closed position, said pin adapted to register with detents provided adjacent each end of said handle means, and a pair of auxiliary supports resting within said handle means and pivotally mounted thereon, and a rectractable wheel assembly mounted on said standard comprising a first bracket slidably mounted on said standard, a second bracket means rigidly affixed to said standard intermediate said first bracket and said handle means, a pair of square cross-section tubular leg elements pivotally mounted on said second bracket, each of said leg elements being pivotally mounted adjacent one end thereof to and on opposite sides of said second bracket, the other end of each of said leg elements being fitted with said wheel brackets being obliquely mounted on said leg elements such that the axles journalled therein are brought into a position perpendicular to said standard when said leg elements are pivoted into operating position, wheel means for rolling engagement with a surface and a pivotally mounted load support bar constructed to be pivotally moved into a position perpendicular to said leg elements, a pair of link elements pivotally attached to said first bracket, each of said link elements being pivotally mounted adjacent one end thereof and on opposite sides of said first bracket and being pivotally attached at the other end thereof to a leg element, stop means on said standard adjacent the other end thereof to bring said first bracket to rest when said link elements have pivotally moved into a position normal to standard, said retractable assembly being constructed to collapse into a position such that said leg elements depend from said second bracket to lay close to said standard.

2. A collapsible, wheeled truck which comprises a tubular rod-like standard, a handle means slidably inserted within said standard and constructed to be extended from or retracted into said standard, thereof and a retractable wheel assembly mounted on said standard said assembly comprising a first bracket slidably mounted on said standard, a second bracket means rigidly affixed to said standard intermediate said first bracket and said handle means, a pair of leg elements pivotally mounted on said second bracket, each of said leg elements being pivotally mounted at one end thereof to and on opposite sides of said second bracket and immediately adjacent said standard, the other end of each of said leg elements being fitted with wheel means for rolling engagement with a surface and a load support bar mounted to be moved into a position perpendicular to said leg elements, a pair of link elements pivotally attached to said first bracket, each of said link elements being pivotally mounted at one end thereof to and on opposite sides of said first bracket and being pivotally attached at the other end thereof to a leg element, stop means on said standard adjacent the other end thereof to bring said first bracket to rest when said link elements have pivotally moved into a position normal to standard, and said handle means is provided with a pair of opposed recesses, each of said recesses having pivotally mounted therein an auxiliary support bar constructed to rest in a position substantially perpendicular to said handle means, said retractable assembly being constructed to be retracted into a position such that said leg elements depend from said second bracket to lay close to said standard.

3. A collapsible, wheeled truck which comprises a rod-like standard having a handle means attached to one end thereof and a retractable wheel assembly mounted on said standard, said assembly comprising a first bracket slidably mounted on said standard, a second bracket means rigidly affixed to said standard intermediate said first bracket and said handle means, a pair of leg elements pivotally mounted on said second bracket, each of said leg elements being pivotally mounted at one end thereof to and on opposite sides of said second bracket and immediately adjacent said standard, said standard and leg elements being in substantially the same plane when said truck is in retracted and collapsible positions, the other end of each of said leg elements being fitted with wheel means for rolling engagement with a surface and a load support bar mounted to be moved into a position perpendicular to said leg elements, a pair of link elements pivotally attached to said first bracket, each of said link elements being pivotally mounted at one end thereof to and on opposite sides of said first bracket and being pivotally attached at the other end thereof to a leg element, and stop means on said standard adjacent the other end thereof to bring said first bracket to rest when said link elements have pivotally moved into a position normal to standard, said retractable assembly being constructed to be retracted into a position such that said leg elements depend from said second bracket to lay close to said standard.

4. A collapsible, wheeled truck in accordance with claim 3 wherein each of said wheel means comprises a fork having a pair of spaced depending arms and a wheel journalled within and between said spaced arms.

5. A collapsible, wheeled truck in accordance with claim 3 further including at least one leg pivotally connected to an end of said support bar.

6. A collapsible, wheeled truck in accordance with claim 5 wherein said leg has a recess therein adapted to receive said load support bar when said leg is in a retracted position.

7. A collapsible, wheeled truck which comprises a tubular rod-like standard, a handle means slidably inserted within said standard and constructed to be extended from or retracted into said standard, thereof and a retractable wheel assembly mounted on said standard said assembly comprising a first bracket slidably mounted on said standard, a second bracket means rigidly affixed to said standard intermediate said first bracket and said handle means, a pair of substantially straight leg elements pivotally mounted on said second bracket, each of said leg elements being pivotally mounted at one end thereof to and on opposite sides of said second bracket and immediately adjacent said standard, the other end of each of said leg elements being fitted with wheel means for rolling engagement with a surface and a pivotally mounted load support bar constructed to be moved into a position perpendicular to said leg elements, a pair of substantially straight link elements pivotally attached to said first bracket, each of said link elements being pivotally mounted at one end thereof to and on opposite sides of said first bracket and being pivotally attached at the other end thereof to a leg element, and stop means on said standard adjacent the other end thereof to bring said first bracket to rest when said link elements have pivotally moved into a position normal to standard, said retractable assembly being constructed to be retracted into a position such that said leg elements depend from said second bracket to lay close to said standard.

8. A collapsible, wheeled truck in accordance with claim 7 in which lock means are provided for retaining said slidable handle in the extended or retracted position.

9. A collapsible, wheeled truck which comprises a rod-like standard having a handle means attached to one end thereof and a retractable wheel assembly mounted on said standard comprising a first bracket slidably mounted on said standard, a second bracket means rigidly affixed to said standard intermediate said first bracket and said handle means, a pair of leg elements pivotally mounted on said second bracket, each of said leg elements being pivotally mounted at one end thereof to and on opposite sides of said second bracket and immediately adjacent said standard, said standard and leg elements being in substantially the same plane when said truck is in both the retracted and collapsible positions, the other end of each of said leg elements being fitted with a wheel bracket having a pair of spaced depending arms and wheel means for rolling engagement with a surface having an axle journalled therein, said axle mounted on and within said spaced fork arms rotatably mounted on said axle for rolling engagement with a surface and a pivotally mounted load support bar constructed to be pivotally moved into a position perpendicular to said leg elements, said wheel brackets being obliquely mounted on said leg elements such that the axles journalled therein are brought into a position perpendicular to said standard when said leg elements are pivoted into operating position, a pair of link elements pivotally attached to said first bracket, each of said link elements being pivotally mounted adjacent one end thereof and on opposite sides of said first bracket and being pivotally attached at the other end thereof to a leg element, stop means on said standard adjacent the other end thereof to bring said first bracket to rest when said link elements have pivotally moved into a position normal to standard, said retractable assembly being constructed to collapse into a position such that said leg elements depend from said second bracket to lay close to said standard.

References Cited by the Examiner

UNITED STATES PATENTS 2,469,242   5/49   Pohl _____ 280—36
2,788,218   4/57   Jaskey _____ 280—38

ARTHUR L. LA POINT, *Primary Examiner.*